United States Patent
Sun et al.

(10) Patent No.: US 9,367,071 B2
(45) Date of Patent: Jun. 14, 2016

(54) AUTOMOBILE ELECTRONIC REGULATOR

(71) Applicants: Haoyu Sun, Guangdong (CN); Jianpeng Sun, Guangdong (CN)

(72) Inventors: Haoyu Sun, Guangdong (CN); Jianpeng Sun, Guangdong (CN)

( * ) Notice: Subject to any disclaimer, the term of this patent is extended or adjusted under 35 U.S.C. 154(b) by 422 days.

(21) Appl. No.: 14/079,871

(22) Filed: Nov. 14, 2013

(65) Prior Publication Data

US 2014/0217815 A1 Aug. 7, 2014

(30) Foreign Application Priority Data

Feb. 5, 2013 (CN) .................. 2013 2 0068281 U

(51) Int. Cl.
*G05F 1/10* (2006.01)
*B60R 16/03* (2006.01)
*G05F 1/455* (2006.01)

(52) U.S. Cl.
CPC . *G05F 1/10* (2013.01); *B60R 16/03* (2013.01); *G05F 1/455* (2013.01)

(58) Field of Classification Search
CPC ............ G05F 1/10; G05F 1/455; B60R 16/03
See application file for complete search history.

(56) References Cited

U.S. PATENT DOCUMENTS

| | | | | |
|---|---|---|---|---|
| 5,119,010 A | * | 6/1992 | Shirata | B60L 11/005 320/110 |
| 5,456,241 A | * | 10/1995 | Ward | F02P 3/0892 123/169 EL |
| 5,526,785 A | * | 6/1996 | Masters | F02P 1/086 123/198 DC |

* cited by examiner

*Primary Examiner* — Rexford Barnie
*Assistant Examiner* — Elim Ortiz

(57) ABSTRACT

An automobile electronic regulator includes a timing circuit, a signal circuit, a phase shift driving circuit, a pulse oscillation outputting circuit, an electronic switching circuit, and an electronic filtering circuit. An input terminal of the electronic filtering circuit is connected to an output terminal of the electronic switching circuit, for supplying the timing circuit, the signal circuit and the phase shift driving circuit with an accurate and stable voltage. The output terminal of the signal circuit is connected to an input terminal of the phase shift driving circuit via a circuit for accelerating and limiting, for driving and amplifying a phase shift of a signal of a generated rectangular square wave. The phase shift driving circuit supplies the pulse oscillation outputting circuit with a phase shift amplification signal. The pulse oscillation outputting circuit uploads a pulse signal to an automobile-mounted inductive load system.

3 Claims, 2 Drawing Sheets

AUTOMOBILE ELECTRONIC REGULATOR

CROSS REFERENCE OF RELATED APPLICATION

This invention claims priority under 35 U.S.C. 119(a-d) to CN 201320068281.5, filed Feb. 5, 2013.

BACKGROUND OF THE PRESENT INVENTION

1. Field of Invention

The present invention relates to an automobile electronic regulator which is able to improve integral operation performance of an automobile.

2. Description of Related Arts

The automobile industry has entered the complete electronic control age. With the improvements in the automobile-mounted electronic control units (ECUs), the performance of the sensors becomes more sophisticated, and the number of automobile-mounted electronic equipments increases continuously, which increases the fun of driving while the drivers experience the advanced performance However, with the increasing integration of the electronic equipments, the mutual induction (the electromagnetic induction) among the wire hardness increases gradually; thus, besides the mutual induction remaining to be solved, the electronic ignition system and the injection system further have following problems.

For the ignition system, the induction voltage which is generated by the primary coils of the ignition coils impedes the flowing of the current within the primary coils; and the impedance is called back electromotive force (EMF) or reverse voltage. The current saturation point of the ignition coils depends on the current running through the ignition coils. The larger current, the stronger magnetic induction lines. The smaller current, the weaker magnetic induction lines. Thus, the back EFM impacts the whole saturation process. In the modern automobile ignition circuit, the connected capacitor aims at accelerating the disappearance of the magnetic field, namely solving the problem of the back EMF. The faster the current within the primary coils disappears, the faster the rapidly-moving magnetic field is able to improve the induction voltage within the secondary coils. However, the capacitor of the circuit is directly connected to ground without forming a good discharging loop for the circuit, so the circuit still fails to fully release the reverse voltage within the primary coils, which remains to be solved properly.

For the fuel injection system, the injection coils suffer from the impact of the back EMF, or the reverse voltage, during the processes of conducting and disconnecting, which causes the lagging of the opening and the closing of the fuel injection needles; such lagging directly results in the unstable injection pressure, the emergence and the generation of the non-uniform atomization phenomenon, and the sensors read wrong data. which all bring about the air-fuel ratio disorder, the lowered power and the increased oil consumption.

For the engine system, the engine belt transmits the power which the engine system needs, and the transmitting is related with the revolution speed of the engine. Thus the engine system works in the speed-changing environment which is equivalent to the frequency-changing environment. Although the electricity generated by the AC dynamo is processed with the electronic commutation and the voltage regulation, it is impossible to eliminate the irregular DC pulsation phenomenon. Uploading the irregular DC pulsation phenomenon to the ignition and injection systems, may severely impact the primary saturation and release processes of the ignition coils, and the opening and closing of the injection needle, and also may impact the injection pressure and the atomization degree of the fuel oil; finally, the uploading may affect the power, the fuel economy, the emission and other problems.

For the automobile wire harness, the electronic additional performance of the modern car keeps increasing, which increases the driving comfort; meanwhile, the increase of the automobile wire harness leads to the increase of the mutual inductance (electric inductance phenomenon) among the wire harness. As a result, the severe electricity pollution may occur and the automobile-mounted sensors may report untrue data.

Finally, because of the problems listed above, the ECU sends out incorrect instructions and the integral operation performance of the automobile may be severely affected.

SUMMARY OF THE PRESENT INVENTION

In order to overcome the above problems and exhibit best performance, the present invention provides an automobile electronic regulator. Without changing an original design of an automobile, an automobile electronic regulator of the present invention is able to improve combustion efficiency of an engine, increase torque, improve fuel oil economy and reduce exhaust emission of the automobile; because of a voltage clamp effect of electronic pulses, the automobile electronic regulator of the present invention also stabilizes a circuit of the integral automobile, protects automobile-mounted appliances, and elongates a service life of the automobile.

The present invention adopts following solutions. An automobile electronic regulator comprises a timing circuit, a signal circuit, a phase-shift driving circuit, a pulse oscillation outputting circuit, an electronic switching circuit, an electronic filtering circuit, a fan motor driving circuit, an input inductance filtering circuit, an output inductance filtering circuit, a system of automobile-mounted inductive loads and a fuse. An input terminal of the electronic filtering circuit and an output terminal of the electronic switching circuit are connected, for supplying the fan motor driving circuit, the timing circuit, the signal circuit and the phase shift driving circuit with an accurate and stable voltage. An output terminal of the signal circuit and an input terminal of the phase-shift driving circuit are connected, for driving and amplifying a phase shift of a signal of a generated rectangular square wave. The phase shift driving circuit is for supplying the pulse oscillation outputting circuit with a phase shift amplification signal; the pulse oscillation outputting circuit uploads a pulse signal to the system of the automobile-mounted inductive loads. The timing circuit comprises a first resistor 701, a second resistor 702 and a first capacitor 703. The signal circuit comprises a first integrated circuit (IC) 601 and a second capacitor 602. The phase shift driving circuit comprises a third resistor 401, a fourth resistor 402, a fifth resistor 403, a first bipolar junction transistor (BJT) 404 and a sixth resistor 405. The pulse oscillation outputting circuit comprises a field effect transistor (FET) 307, a first inductor 306, a first diode 301, a second diode 302, a first switch 305, a second switch 304 and a second inductor 303. The electronic switching circuit comprises a third diode 1009, a seventh resistor 1001, an eighth resistor 1002, a ninth resistor 1003, a tenth resistor 1007, an eleventh resistor 1008, a third capacitor 1004, a fourth capacitor 1010, a first voltage-regulator tube 1005, a second BJT 1006 and a first pin and a second pin of a second IC 906. The electronic filtering circuit comprises a fifth capacitor 902, a sixth capacitor 904, a twelfth resistor 905, a second voltage-regulator tube 903, a third BJT 901 and a third pin and a fourth pin of the second IC 906. A pulse indicating circuit comprises a thirteenth resistor 501 and a first light-emitting diode (LED) 502. The fan motor driving circuit comprises a fan motor 801, a fourteenth resistor 802 and a fourth BJT 803. The input inductance filtering circuit comprises a third inductor 1101. The output inductance filtering circuit comprises a fourth inductor 201. A first terminal of the first resistor 701 is connected to a seventh pin of the first IC 601 and a first terminal of the second resistor 702. A second terminal of the second resistor 702 is connected to a second pin and a sixth pin of the first IC 601, and a first terminal of the first capacitor 703. A second terminal of the first capacitor 703 is connected to ground. A second terminal of the first resistor 701 is respectively connected to a fourth pin and an eighth pin of the first IC 601, a positive electrode of the fifth capacitor 902, the third resistor 401, an emitter of the third BJT 901 and the fourteenth resistor 802. A fifth pin of the first IC 601 is connected to a first terminal of the second capacitor 602; a second terminal of the second capacitor 602 is connected to ground. A first pin of the first IC 601 is connected to ground. A negative electrode of the fifth capacitor 902 is also connected to ground. A third pin of the first IC 601 is connected to a first terminal of the fifth resistor 403, and a first terminal of the thirteenth resistor 501. A second terminal of the fifth resistor 403 is connected to a base of the first BJT 404. A second terminal of the thirteenth resistor 501 is connected to a positive electrode of the LED 502. A negative electrode of the LED 502 is connected to ground. An emitter of the first BJT 404 is connected to ground. A collector of the first BJT 404 is connected to a first terminal of the sixth resistor 405, a first terminal of the fourth resistor 402 and a G terminal of the FET 307. A second terminal of the sixth resistor 405 is connected to ground. A second terminal of the fourth resistor 402 is connected to a first terminal of the third resistor 401. A second terminal of the third resistor 401 is connected to the fourth pin and the eighth pin of the first IC 601, the fourteenth resistor 802, the first resistor 701, the positive electrode of the fifth capacitor 902 and the emitter of the third BJT 901. A positive electrode of the sixth capacitor 904 is connected to a negative electrode of the second voltage-regulator tube 903, the twelfth resistor 905 and the fourth pin of the second IC 906. A base of the third BJT 901 is connected to the third pin of the second IC 906. A positive electrode of the second voltage-regulator tube 903 is connected to ground. A negative electrode of the sixth capacitor 904 is connected to ground. The negative electrode of the fifth capacitor 902 is connected to ground. The twelfth resistor 905, a first terminal of the eleventh resistor 1008, the first pin of the second IC 906 and a collector of the third BJT 901 are connected together. The second pin of the second IC 906 is connected to a first terminal of the tenth resistor 1007. A second terminal of the tenth resistor 1007 is connected to a collector of the second BJT 1006. An emitter of the second BJT 1006 is connected to ground. A second terminal of the eleventh resistor 1008 is connected to a negative electrode of the third diode 1009 and a first terminal of the fan motor 801. A second terminal of the fan motor 801 is connected to a collector of the fourth BJT 803. The fourteenth resistor 802 is connected to a base of the fourth BJT 803. An emitter of the fourth BJT 803 is connected to ground. A base of the second BJT 1006, a first terminal of the third capacitor 1004 and a positive electrode of the first voltage-regulator tube 1005 are connected. A second terminal of the third capacitor 1004 is connected to ground. A negative electrode of the first voltage-regulator tube 1005 is connected to a first terminal of the eighth resistor 1002. A second terminal of the eighth resistor 1002 is connected to a first terminal of the ninth resistor 1003, a first terminal of the seventh resistor 1001 and a first terminal of the fourth capacitor 1010. A second terminal of the ninth resistor 1003 is connected to ground. A second terminal of the fourth capacitor 1010 is connected to ground. A second terminal of the seventh resistor 1001 is connected to a positive electrode of the third diode 1009, and a first terminal of the third inductor 1101. An S electrode of the FET 307 is connected to ground. A D electrode of the FET 307 is connected to a first terminal of the first inductor 306, a first terminal of the second inductor 303 and a first terminal of the second switch 304. A second terminal of the first inductor 306 is connected to a first terminal of the first switch 305. A second terminal of the first switch 305 is connected to a second terminal of the second inductor 303, and a negative electrode of the second diode 302. A second terminal of the second switch 304 is connected to a positive electrode of the first diode 301. A negative electrode of the first diode 301, a positive electrode of the second diode 302, a second terminal of the third inductor 1101, a first terminal of the fourth inductor 201 and an output terminal B+ are connected together. A second terminal of the fourth inductor 201 is connected to a first terminal of a fuse 101. A second terminal of the fuse 101 is connected to an input terminal of a fuse holder of an automobile-mounted positive electricity system.

The LED 502 is an indicating light for displaying a normal output of the pulse signal. The indicating light is able to directly indicate working states of the pulses of the automobile electronic regulator.

The fan motor 801 is able to cool a temperature, or dissipate heat, of the output circuit of the pulse energy, and able to improve efficiency.

The automobile electronic regulator of the present invention has following working principles. An anode of the automobile electronic regulator is connected to an input terminal of the fuse holder of the automobile-mounted positive electricity system which comprises an insurance circuit interface of an inductive load circuit, such as an anti-lock braking system (ABS), an automatic transmission (AT), an electronic ignition, an electronic injection, an electronic throttle valve, an electric window and an electronic driving and turning. The output terminal B+ is connected to an output terminal of the fuse holder of the automobile-mounted positive electricity system, which is equivalent to changing an original structure of a fuse into a combination of the fourth inductor 201 and the fuse 101. A cathode of the automobile electronic regulator is connected to a cathode of an automobile-mounted power source, or is directly grounded. The electronic switching circuit closes an electronic switch after identifying the voltage; the electronic filtering circuit stabilizes the voltage, for supplying the signal circuit and the phase shift driving circuit with the stable and accurate working voltage; the signal circuit sends out the pulse signal of the rectangular square waves, wherein the pulse signal of the rectangular square waves are inputted into the phase shift driving circuit and the pulse signal indicating circuit. Because of the normal output of the pulse signal of the rectangular square waves, the LED 502 of the pulse signal indicating circuit lights up and correctly indicates an output state of the pulse signal. Meanwhile, the pulse signal which are processed with phase shift amplification by the phase shift driving circuit, are inputted into the pulse oscillation outputting circuit to be stored or released. A reverse voltage, or a back EMF, is formed via the storing and releasing by the inductors which is an electricity-magnetism-electricity transformation. After rapid conducting and disconnecting of the first diode 301 and the second diode 302 (reverse breakdown), the pulse signal are uploaded to the automobile-mounted inductive load system via the B+ channel (the automobile-mounted inductive load system can be the inductive load circuit, such as the ABS, the AT, the electronic ignition, the electronic injection, the electronic throttle valve, the electric window and the electric driving and turning). Thus, the automobile electronic regulator is able to remove the back EMF in a primary coil of an electronic ignition coil which is caused by conducting and disconnecting of an ignition switch, reduce electric resistant force, shorten a saturation time, efficiently improve a saturation capability of an induction current of a secondary coil and improve ignition efficiency; the automobile electronic regulator is also able to remove the back EMF of an injection valve coil which is caused by the conducting and disconnecting of the injection switch, reduce electric resistant force, improve an agility of opening and closing the injection needle valve, increase injection pressure, raise an atomization degree to uniformly mix fuel and air and directly improve a combustion efficiency; and the automobile electronic regulator is able to remove a pulsation phenomenon of a DC output of an automobile-mounted motor and then supply an automobile-mounted circuit with a stable power supply. Moreover, the automobile electronic regulator is also able to remove electromagnetic induction ripples of automobile electronic equipments which are caused by the mutual induction among circuit wire harness, remove electricity pollution of the circuit, and significantly improve an integral operation performance. Because of the improvement in the ignition efficiency, the atomization and mixing degree of the fuel and the air is improved, which directly improves the combustion efficiency of the automobile, increase power and reduce fuel consumption and emission.

The first switch 304 and the second switch 305 are selectively opened and closed according to practical needs, so as to adjust outputted energy.

These and other objectives, features, and advantages of the present invention will become apparent from the following detailed description, the accompanying drawings, and the appended claims.

DETAILED DESCRIPTION OF THE PREFERRED EMBODIMENT

Figure 1:
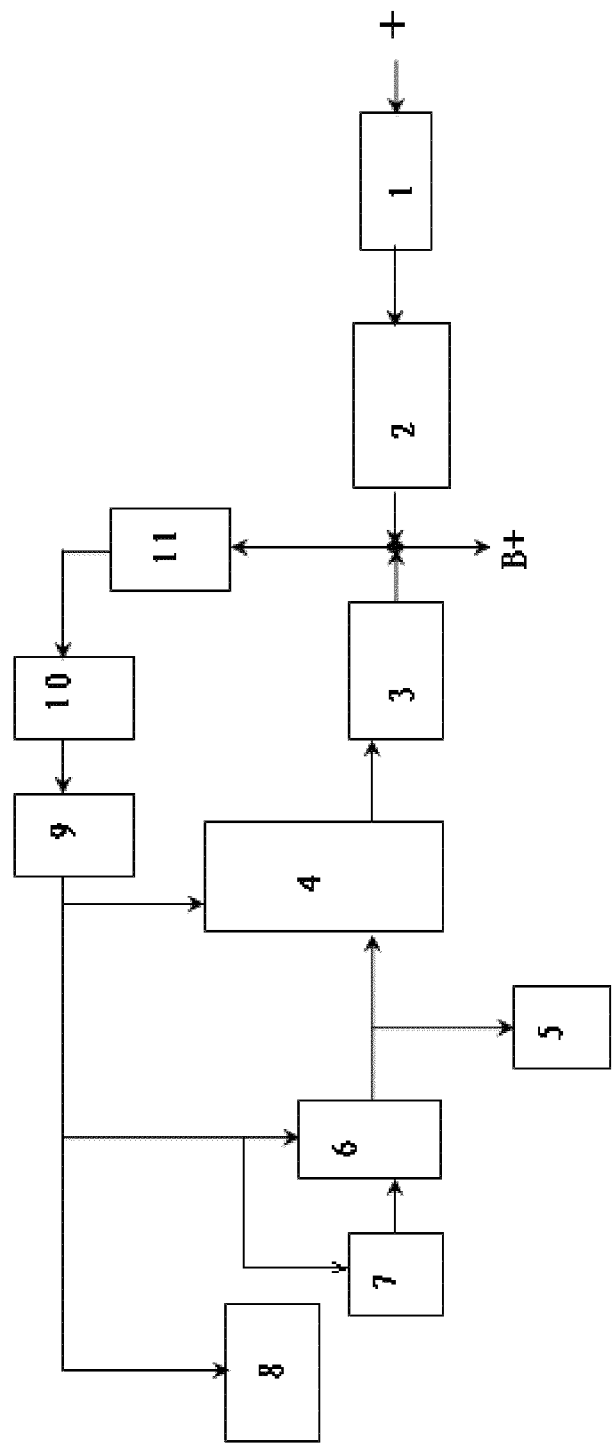
FIG. 1 is a block diagram of an automobile electronic regulator according to a preferred embodiment of the present invention.
Figure 2:
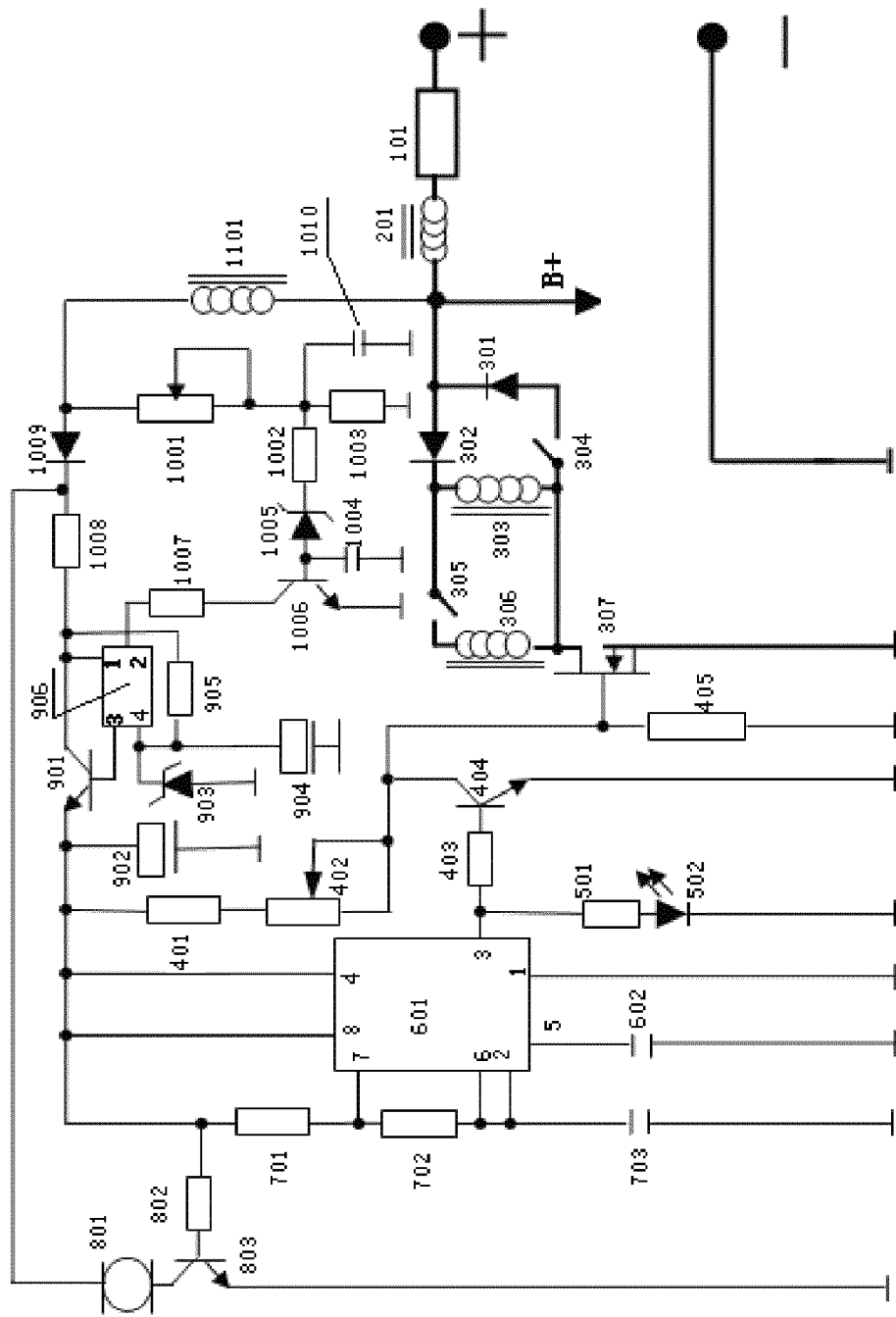
FIG. 2 is a circuit diagram of the automobile electronic regulator according to the preferred embodiment of the present invention.

Referring to FIGS. 1 and 2 of the drawings, according to a preferred embodiment of the present invention, an automobile electronic regulator comprises a fuse 1, an output inductance filtering circuit 2, a pulse oscillation outputting circuit 3, a phase shift driving circuit 4, a pulse indicating circuit 5, a signal circuit 6, a timing circuit 7, a fan motor driving circuit 8, an electronic filtering circuit 9, an electronic switching circuit 10 and an input inductance filtering circuit 11. An input terminal of the electronic filtering circuit 9 is connected to an output terminal of the electronic switching circuit 10, for supplying the timing circuit 7, the signal circuit 6 and the phase shift driving circuit 4 with an accurate and stable voltage. An output terminal of the signal circuit 6 is connected to an input terminal of the phase shift driving circuit 4, for driving and amplifying a phase shift of a signal of a generated rectangular square wave. The phase shift driving circuit 4 supplies the pulse oscillation outputting circuit 3 with a phase shift amplification signal. The pulse oscillation outputting circuit 3 uploads a pulse signal to an automobile-mounted inductive load via an output terminal B+.

The timing circuit comprises a first resistor 701, a second resistor 702 and a first capacitor 703. The signal circuit comprises a first IC 601 and a second capacitor 602. The phase shift driving circuit comprises a third resistor 401, a fourth resistor 402, a fifth resistor 403, a first BJT 404 and a sixth resistor 405. The pulse oscillation outputting circuit comprises an FET 307, a first inductor 306, a first diode 301, a second diode 302, a first switch 305, a second switch 304 and a second inductor 303. The electronic switching circuit comprises a third diode 1009, a seventh resistor 1001, an eighth resistor 1002, a ninth resistor 1003, a tenth resistor 1007, an eleventh resistor 1008, a third capacitor 1004, a fourth capacitor 1010, a first voltage-regulator tube 1005, a second BJT 1006 and a first pin and a second pin of a second IC 906. The electronic filtering circuit comprises a fifth capacitor 902, a sixth capacitor 904, a twelfth resistor 905, a second voltage-regulator tube 903, a third BJT 901 and a third pin and a fourth pin of the second IC 906. The pulse indicating circuit comprises a thirteenth resistor 501 and an LED 502. The fan motor driving circuit comprises a fan motor 801, a fourteenth resistor 802 and a fourth BJT 803. The input inductance filtering circuit comprises a third inductor 1101.

The output inductance filtering circuit comprises a fourth inductor 201. A first terminal of the first resistor 701 is connected to a seventh pin of the first IC 601 and a first terminal of the second resistor 702. A second terminal of the second resistor 702 is connected to a second pin and a sixth pin of the first IC 601, and a first terminal of the first capacitor 703. A second terminal of the first capacitor 703 is connected to ground. A second terminal of the first resistor 701 is respectively connected to a fourth pin and an eighth pin of the first IC 601, a positive electrode of the fifth capacitor 902, the third resistor 401, an emitter of the third BJT 901 and the fourteenth resistor 802. A fifth pin of the first IC 601 is connected to a first terminal of the second capacitor 602; a second terminal of the second capacitor 602 is connected to ground. A first pin of the first IC 601 is connected to ground. A negative electrode of the fifth capacitor 902 is also connected to ground. A third pin of the first IC 601 is connected to a first terminal of the fifth resistor 403, and a first terminal of the thirteenth resistor 501. A second terminal of the fifth resistor 403 is connected to a base of the first BJT 404. A second terminal of the thirteenth resistor 501 is connected to a positive electrode of the LED 502. A negative electrode of the LED 502 is connected to ground. An emitter of the first BJT 404 is connected to ground. A collector of the first BJT 404 is connected to a first terminal of the sixth resistor 405, a first terminal of the fourth resistor 402 and a G terminal of the FET 307. A second terminal of the sixth resistor 405 is connected to ground. A second terminal of the fourth resistor 402 is connected to a first terminal of the third resistor 401. A second terminal of the third resistor 401 is connected to the fourth pin and the eighth pin of the first IC 601, the fourteenth resistor 802, the first resistor 701, the positive electrode of the fifth capacitor 902 and the emitter of the third BJT 901. A positive electrode of the sixth capacitor 904 is connected to a negative electrode of the second voltage-regulator tube 903, the twelfth resistor 905 and the fourth pin of the second IC 906. A base of the third BJT 901 is connected to the third pin of the second IC 906. A positive electrode of the second voltage-regulator tube 903 is connected to ground. A negative electrode of the sixth capacitor 904 is connected to ground. The negative electrode of the fifth capacitor 902 is connected to ground. The twelfth resistor 905, a first terminal of the eleventh resistor 1008, the first pin of the second IC 906 and a collector of the third BJT 901 are connected together. The second pin of the second IC 906 is connected to a first terminal of the tenth resistor 1007. A second terminal of the tenth resistor 1007 is connected to a collector of the second BJT 1006. An emitter of the second BJT 1006 is connected to ground. A second terminal of the eleventh resistor 1008 is connected to a negative electrode of the third diode 1009 and a first terminal of the fan motor 801. A second terminal of the fan motor 801 is connected to a collector of the fourth BJT 803. The fourteenth resistor 802 is connected to a base of the fourth BJT 803. An emitter of the fourth BJT 803 is connected to ground. A base of the second BJT 1006, a first terminal of the third capacitor 1004 and a positive electrode of the first voltage-regulator tube 1005 are connected. A second terminal of the third capacitor 1004 is connected to ground. A negative electrode of the first voltage-regulator tube 1005 is connected to a first terminal of the eighth resistor 1002. A second terminal of the eighth resistor 1002 is connected to a first terminal of the ninth resistor 1003, a first terminal of the seventh resistor 1001 and a first terminal of the fourth capacitor 1010. A second terminal of the ninth resistor 1003 is connected to ground. A second terminal of the fourth capacitor 1010 is connected to ground. A second terminal of the seventh resistor 1001 is connected to a positive electrode of the third diode 1009, and a first terminal of the third inductor 1101. An S electrode of the FET 307 is connected to ground. A D electrode of the FET 307 is connected to a first terminal of the first inductor 306, a first terminal of the second inductor 303 and a first terminal of the second switch 304. A second terminal of the first inductor 306 is connected to a first terminal of the first switch 305. A second terminal of the first switch 305 is connected to a second terminal of the second inductor 303, and a negative electrode of the second diode 302. A second terminal of the second switch 304 is connected to a positive electrode of the first diode 301. A negative electrode of the first diode 301, a positive electrode of the second diode 302, a second terminal of the third inductor 1101, a first terminal of the fourth inductor 201 and an output terminal B+ are connected together. A second terminal of the fourth inductor 201 is connected to a first terminal of a fuse 101. A second terminal of the fuse 101 is connected to an input terminal of a fuse holder of an automobile-mounted positive electricity system.

According to the preferred embodiment of the present invention, the automobile electronic regulator has following working principles. Via the signal circuit 6 (the first IC 601 and the second capacitor 602), the timing circuit 7 (the first resistor 701, the second resistor 702 and the first capacitor 703) outputs a rectangular square wave pulse signal, for supplying the phase shift amplifying circuit (the third resistor 401, the fourth resistor 402, the fifth resistor 403, the first BJT 404 and the sixth resistor 405) with a pulse driving signal. Meanwhile, the rectangular square wave pulse signal is directly uploaded to the pulse indicating circuit (the thirteenth resistor 501 and the LED 502) to correctly indicate a working state of the pulse signal. After being driven by the phase shift driving circuit 4, the pulse signal is inputted into the pulse oscillation outputting circuit 3 (the FET 307, the first inductor 306, the second inductor 303, the first switch 305, the second switch 304 and the second diode 302) to be stored and released, then forwardly and rapidly released through a channel of the diode 301, and processed with an electromagnetic transformation in an order of electricity-magnetism-electricity to form a reverse voltage (a back EMF). The back EMF (a reverse pulse) is uploaded to the automobile-mounted inductive load system via the output terminal B+. The automobile-mounted inductive load system can be an input interface of an inductive load insurance circuit, such as an ABS, an AT, an electronic ignition, an electronic injection, an electronic throttle valve, an electric window and an electronic driving and turning.

Adding the above reverse pulse energy to a primary coil of an ignition system, is able to remove the back EMF which is generated by a shifting process between conducting and disconnecting the ignition switch, shorten a saturation process and improve an ignition efficiency of the ignition system. Adding the reverse pulse energy to a fuel injection coil is able to remove the back EMF in the fuel injection coil which is caused by a shifting process between conducting and disconnecting an injection needle valve, improve an agility of opening and closing the injection needle valve, increase an injection pressure, raise an atomization degree to uniformly mix fuel and air and thus facilitate fully combusting. Adding the reverse pulse energy to a DC output system of an AC dynamo is able to remove a pulsation DC phenomenon which is caused by speed changing and frequency changing, and supply an automobile-mounted control system with a stable working power source. Adding the reverse pulse energy to an automobile-mounted power source system is able to remove a mutual inductance and an electromagnetic induction among various wire harness, remove electricity pollution of a power source circuit, and further purify sensing and executing circuits. The reverse pulse energy is directly able to improve the fuel injection and the ignition, raise the atomization degree, remove the mutual inductance and the electromagnetic inductance among the wire harness, remove the pulsation phenomenon of the DC output of the dynamo, improve an integral operation performance of an automobile, and mainly improve a power of the automobile and a fuel economy and reduce pollution to environment.

According to a voltage of a positive electricity system of the automobile-mounted power source, the electronic switching circuit 10 (the fourth capacitor 1010 for filtering, the seventh resistor 1001 and the ninth resistor 1003 for dividing the voltage, the eighth resistor 1002 for limiting a current, the first voltage-regulator diode 1005 for avalanching and disconnecting, and the second BJT 1006 for conducting and disconnecting) automatically judges a switching voltage value. When the switching voltage value is higher than a pre-designated voltage value, the first voltage-regulator diode 1005 generates the avalanche, and thus the second BJT 1006 is conducted; as a result, the circuit is supplied with electricity and that the timing circuit 7, the fan motor driving circuit 8, the signal circuit 6 and the phase shift driving circuit 4 are all supplied with the stable working power source via the electronic filtering circuit 9 (the twelfth resistor 905, the sixth capacitor 904, the second voltage-regulator tube 903, the third BJT 901, the third pin and the fourth pin of the second IC 906), wherein the LED 502 of the pulse indicating circuit (the thirteenth resistor 501 and the LED 502) lights up and indicates that the pulse signal is working normally. When the switching voltage value is lower than the pre-designated voltage value, the first voltage-regulator diode 1005 is prevented from avalanching and thus prevented from conducting; meanwhile, the collector and the emitter of the second BJT 1006 are unable to conduct, and the first pin and the second pin of the second IC 906 of the electronic switching circuit 10 are also unable to conduct. As a result, the third pin and the fourth pin of the second IC 906 of the electronic filtering circuit 9 are disconnected; the third BJT 901 of the electronic filtering circuit 9 fails to conduct, and the emitter of the third BJT 901 is unable to output electricity; the whole circuit has no power supply and the automobile electronic regulator stops working.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An automobile electronic regulator, comprising a fuse (1), an output inductance filtering circuit (2), a pulse oscillation outputting circuit (3), a phase shift driving circuit (4), a pulse indicating circuit (5), a signal circuit (6), a timing circuit (7), a fan motor driving circuit (8), an electronic filtering circuit (9), an electronic switching circuit (10) and an input inductance filtering circuit (11), wherein said fuse (1) is connected to said output inductance filtering circuit (2); an output terminal of said output inductance filtering circuit (2), an input terminal of said input inductance filtering circuit (11), an output terminal of said pulse oscillation outputting circuit (3) and an output terminal B+ are all connected to an output terminal of a fuse holder of an automobile-mounted positive electricity system; an output terminal of said input inductance filtering circuit (11) is connected to an input terminal of said electronic switching circuit (10); an output terminal of said electronic switching circuit (10) is connected to an input terminal of said electronic filtering circuit (9); an output terminal of said electronic filtering circuit (9) is connected to said phase shift driving circuit (4), said fan motor driving circuit (8), said signal circuit (6) and said timing circuit (7); said timing circuit (7) is connected to said signal circuit (6); said signal circuit (6) is connected to said pulse indicating circuit (5) and said phase shift driving circuit (4);

wherein said electronic filtering circuit (9) is for supplying said timing circuit (7), said signal circuit (6) and said phase shift driving circuit (4) with an accurate and stable voltage; an output terminal of said signal circuit (6) is connected to an input terminal of said phase shift driving circuit (4), for driving and amplifying a phase shift of a signal of a generated rectangular square wave; said phase shift driving circuit (4) is for supplying said pulse oscillation outputting circuit (3) with a phase shift amplification signal; said pulse oscillation outputting circuit (3) is for uploading a pulse signal to an automobile-mounted inductive load via said output terminal B+; and said timing circuit comprises a first resistor (701), a second resistor (702) and a first capacitor (703); said signal circuit comprises a first IC (601) and a second capacitor (602); said phase shift driving circuit comprises a third resistor (401), a fourth resistor (402), a fifth resistor (403), a first BJT (404) and a sixth resistor (405); said pulse oscillation outputting circuit comprises an FET (307), a first inductor (306), a first diode (301), a second diode (302), a first switch (305), a second switch (304) and a second inductor (303); said electronic switching circuit comprises a third diode (1009), a seventh resistor (1001), an eighth resistor (1002), a ninth resistor (1003), a tenth resistor (1007), an eleventh resistor (1008), a third capacitor (1004), a fourth capacitor (1010), a first voltage-regulator tube (1005), a second BJT (1006) and a first pin and a second pin of a second IC (906); said electronic filtering circuit comprises a fifth capacitor (902), a sixth capacitor (904), a twelfth resistor (905), a second voltage-regulator tube (903), a third BJT (901) and a third pin and a fourth pin of said second IC (906); said pulse indicating circuit comprises a thirteenth resistor (501) and an LED (502); said fan motor driving circuit comprises a fan motor (801), a fourteenth resistor (802) and a fourth BJT (803); said input inductance filtering circuit comprises a third inductor (1101); said output inductance filtering circuit comprises a fourth inductor (201);

wherein a first terminal of said first resistor (701) is connected to a seventh pin of said first IC (601) and a first terminal of said second resistor (702); a second terminal of said second resistor (702) is connected to a second pin and a sixth pin of said first IC (601), and a first terminal of said first capacitor (703); a second terminal of said first capacitor (703) is connected to ground; a second terminal of said first resistor (701) is respectively connected to a fourth pin and an eighth pin of said first IC (601), a positive electrode of said fifth capacitor (902), said third resistor (401), an emitter of said third BJT (901) and said fourteenth resistor (802); a fifth pin of said first IC (601) is connected to a first terminal of said second capacitor (602); a second terminal of said second capacitor (602) is connected to ground; a first pin of said first IC 601 is connected to ground; a negative electrode of said fifth capacitor (902) is also connected to ground; a third pin of said first IC (601) is connected to a first terminal of said fifth resistor (403), and a first terminal of said thirteenth resistor (501); a second terminal of said fifth resistor (403) is connected to a base of said first BJT (404); a second terminal of said thirteenth resistor (501) is connected to a positive electrode of said LED (502), and a negative electrode of said LED (502) is connected to ground; an emitter of said first BJT (404) is connected to ground; a collector of said first BJT (404) is connected to a first terminal of said sixth resistor (405), a first terminal of said fourth resistor (402) and a G terminal of said FET (307); a second terminal of said sixth resistor (405) is connected to ground; a second terminal of said fourth resistor (402) is connected to a first terminal of said third resistor (401); a second terminal of said third resistor (401) is connected to said fourth pin and said eighth pin of said first IC (601), said fourteenth resistor (802), said first resistor (701), said positive electrode of said fifth capacitor (902) and said emitter of said third BJT (901); a positive electrode of said sixth capacitor (904) is connected to a negative electrode of said second voltage-regulator tube (903), said twelfth resistor (905) and said fourth pin of said second IC (906); a base of said third BJT (901) is connected to said third pin of said second IC (906); a positive electrode of said second voltage-regulator tube (903) is connected to ground; a negative electrode of said sixth capacitor (904) is connected to ground; said negative electrode of said fifth capacitor (902) is connected to ground; said twelfth resistor (905), a first terminal of said eleventh resistor (1008), said first pin of said second IC (906) and a collector of said third BJT (901) are connected together; said second pin of said second IC (906) is connected to a first terminal of said tenth resistor (1007); a second terminal of said tenth resistor (1007) is connected to a collector of said second BJT (1006); an emitter of said second BJT (1006) is connected to ground; a second terminal of said eleventh resistor (1008) is connected to a negative electrode of said third diode (1009) and a first terminal of said fan motor (801); a second terminal of said fan motor (801) is connected to a collector of said fourth BJT (803); said fourteenth resistor (802) is connected to a base of said fourth BJT (803); an emitter of said fourth BJT (803) is connected to ground; a base of said second BJT (1006), a first terminal of said third capacitor (1004) and a positive electrode of said first voltage-regulator tube (1005) are connected; a second terminal of said third capacitor (1004) is connected to ground; a negative electrode of said first voltage-regulator tube (1005) is connected to a first terminal of said eighth resistor (1002); a second terminal of said eighth resistor (1002) is connected to a first terminal of said ninth resistor (1003), a first terminal of said seventh resistor (1001) and a first terminal of said fourth capacitor (1010); a second terminal of said ninth resistor (1003) is connected to ground; a second terminal of said fourth capacitor (1010) is connected to ground; a second terminal of said seventh resistor (1001) is connected to a positive electrode of said third diode (1009), and a first terminal of said third inductor (1101); an S electrode of said FET (307) is connected to ground; a D electrode of said FET (307) is connected to a first terminal of said first inductor (306), a first terminal of said second inductor (303) and a first terminal of said second switch (304); a second terminal of said first inductor (306) is connected to a first terminal of said first switch (305); a second terminal of said first switch (305) is connected to a second terminal of said second inductor (303), and a negative electrode of said second diode (302); a second terminal of said second switch (304) is connected to a positive electrode of said first diode (301); a negative electrode of said first diode (301), a positive electrode of said second diode (302), a second terminal of said third inductor (1101), a first terminal of said fourth inductor (201) and said output terminal B+ are connected together; a second terminal of said fourth inductor (201) is connected to a first terminal of said fuse (101); a second terminal of said fuse (101) is connected to an input terminal of the fuse holder of the automobile-mounted positive electricity system.

2. The automobile electronic regulator, as recited in claim 1, wherein an anode of said automobile electronic regulator is connected to the input terminal of the fuse holder of the automobile-mounted positive electricity system; said output terminal B+ is connected to the output terminal of the fuse holder of the automobile-mounted positive electricity system; a cathode of said automobile electronic regulator is connected to a cathode of an automobile-mounted power source or an automobile body.

3. The automobile electronic regulator, as recited in claim 1, wherein the input terminal of the fuse holder of the automobile-mounted positive electricity system comprises an ABS, an automatic transmission, an electronic ignition, an electronic injection, an electronic throttle valve, an electric window and an electronic driving and turning.

* * * * *